United States Patent
Kingsford

(10) Patent No.: US 11,577,432 B2
(45) Date of Patent: Feb. 14, 2023

(54) COMPOSITE STRUCTURE REINFORCEMENT UTILIZING THERMAL PROPERTIES OF FORMING ELEMENTS

(71) Applicant: Kenji Kingsford, Oro Valley, AZ (US)

(72) Inventor: Kenji Kingsford, Oro Valley, AZ (US)

(*) Notice: Subject to any disclaimer, the term of this patent is extended or adjusted under 35 U.S.C. 154(b) by 308 days.

(21) Appl. No.: 14/295,310

(22) Filed: Jun. 3, 2014

(65) Prior Publication Data

US 2015/0343711 A1    Dec. 3, 2015

(51) Int. Cl.
 B29C 70/42 (2006.01)
 B29C 33/44 (2006.01)
 (Continued)

(52) U.S. Cl.
 CPC .......... B29C 33/44 (2013.01); B29C 33/0033 (2013.01); B29C 70/446 (2013.01); B29D 99/0014 (2013.01); B32B 1/08 (2013.01); B32B 3/02 (2013.01); B32B 3/20 (2013.01); B32B 3/28 (2013.01); B32B 5/022 (2013.01); B32B 5/10 (2013.01); B32B 7/027 (2019.01);
 (Continued)

(58) Field of Classification Search
 CPC ..... B29C 33/485; B29C 33/505; B29C 33/76; B29C 70/446
 See application file for complete search history.

(56) References Cited

U.S. PATENT DOCUMENTS 4,946,526 A * 8/1990 Petty-Galis ........... B29C 33/448
                                                          156/155
5,087,804 A * 2/1992 McGaffigan ........... H05B 6/106
                                                          219/676
(Continued)

FOREIGN PATENT DOCUMENTS

CN        202487269      10/2012
JP        H06198794       7/1994

OTHER PUBLICATIONS

Palmer, R.J., Graphite/Epoxy Composite Stiffened Panel Fabrication Development, NASA Contractor Report 172204 (Mar. 1984), 125 pages. (Year: 1984).*

(Continued)

Primary Examiner — Matthew J Daniels
(74) Attorney, Agent, or Firm — Snell & Wilmer L.L.P.

(57) ABSTRACT

Forming systems and assemblies as disclosed herein comprise a composite material comprising a structural component and a resin component combined with the reinforcing component. A forming element is disposed within the composite material and has a coefficient of thermal expansion that is greater than that of the composite material. The forming element is positioned to provide a desired integral structural reinforcement and/or surface feature to the composite. The composite material may comprise one or more passages extending from a surface thereof to the forming element. The composite material may be cured by heat to take a set configuration and then allowed to cool. The cooling of the composite material and the forming element enables the forming element to contract relative to the composite material and become delaminated therefrom to (Continued)

facilitate easy removal, and thereby provide an improved method and assembly for making structural reinforcing features in composite structures.

21 Claims, 3 Drawing Sheets

(51) Int. Cl.

| | | |
|---|---|---|
| *B32B 27/12* | (2006.01) | |
| *B29C 70/44* | (2006.01) | |
| *B32B 27/26* | (2006.01) | |
| *B32B 27/20* | (2006.01) | |
| *B32B 3/20* | (2006.01) | |
| *B32B 5/10* | (2006.01) | |
| *B32B 27/32* | (2006.01) | |
| *B32B 27/28* | (2006.01) | |
| *B32B 3/28* | (2006.01) | |
| *B32B 27/30* | (2006.01) | |
| *B32B 5/02* | (2006.01) | |
| *B32B 3/02* | (2006.01) | |
| *B32B 1/08* | (2006.01) | |
| *B29C 33/00* | (2006.01) | |
| *B32B 27/08* | (2006.01) | |
| *B29D 99/00* | (2010.01) | |
| *B32B 7/027* | (2019.01) | |
| *B29C 33/76* | (2006.01) | |

(52) U.S. Cl.
CPC .............. *B32B 27/08* (2013.01); *B32B 27/12* (2013.01); *B32B 27/20* (2013.01); *B32B 27/26* (2013.01); *B32B 27/28* (2013.01); *B32B 27/304* (2013.01); *B32B 27/32* (2013.01); *B32B 27/322* (2013.01); *B29C 33/76* (2013.01); *B29K 2995/0012* (2013.01); *B32B 2260/021* (2013.01); *B32B 2260/046* (2013.01); *B32B 2307/202* (2013.01); *B32B 2307/302* (2013.01); *B32B 2307/50* (2013.01); *B32B 2307/558* (2013.01); *B32B 2307/718* (2013.01); *B32B 2307/732* (2013.01); *B32B 2605/08* (2013.01); *B32B 2605/18* (2013.01)

(56) References Cited

U.S. PATENT DOCUMENTS

| | | | | |
|---|---|---|---|---|
| 5,160,671 | A * | 11/1992 | Satoh | B29C 43/32 |
| | | | | 264/230 |
| 5,170,967 | A * | 12/1992 | Hamamoto | B29C 53/805 |
| | | | | 244/119 |
| 5,269,657 | A * | 12/1993 | Garfinkle | B29C 70/20 |
| | | | | 416/226 |
| 5,387,098 | A * | 2/1995 | Willden | B29C 53/82 |
| | | | | 264/257 |
| 5,508,496 | A * | 4/1996 | Hansen | B29C 65/3656 |
| | | | | 156/272.4 |
| 5,547,629 | A * | 8/1996 | Diesen | B29C 33/505 |
| | | | | 264/257 |
| 5,753,165 | A * | 5/1998 | Watanabe | B29C 39/028 |
| | | | | 264/138 |
| 5,846,368 | A | 12/1998 | Sakaguchi et al. | |
| 8,043,457 | B2 * | 10/2011 | Jones | B29C 33/301 |
| | | | | 156/173 |
| 9,309,913 | B2 * | 4/2016 | Klaukien | F16B 11/006 |
| 2007/0175031 | A1 * | 8/2007 | Pham | B29C 70/446 |
| | | | | 29/889.2 |
| 2008/0116618 | A1 * | 5/2008 | Martin | B29C 33/40 |
| | | | | 264/480 |
| 2009/0298976 | A1 | 12/2009 | Yano et al. | |
| 2010/0006739 | A1 * | 1/2010 | Robins | B29C 70/865 |
| | | | | 249/64 |
| 2010/0230542 | A1 * | 9/2010 | Childs | B64C 3/182 |
| | | | | 244/123.1 |
| 2010/0261000 | A1 | 10/2010 | Jones | |
| 2010/0291370 | A1 | 11/2010 | Jones | |

OTHER PUBLICATIONS

Young, T., and D.O'Driscoll, Impact of Nd-YAG laser drilled holes on the strength and stiffness of laminar flow carbon fibre reinforced composite panels, Composites: Part A, vol. 33 (2002), pp. 1-9. (Year: 2002).*

PCT; International Search Report and Written Opinion dated Feb. 5, 2016 in Application No. PCT/US2015/033842.

International Preliminary Report on Patentability dated Dec. 6, 2016 in corresponding International ApplicationNo. PCT/US2015/033842 filed Jun. 2, 2015; total 6 pages.

* cited by examiner

COMPOSITE STRUCTURE REINFORCEMENT UTILIZING THERMAL PROPERTIES OF FORMING ELEMENTS

FIELD

The concept as disclosed herein relates to the production of composite structures utilized to manufacture high strength, light weight components, e.g., used in but not limited to the aerospace and automotive industries, and methods utilized to generate light weight, high strength configurations therefrom.

BACKGROUND

Light weight, high strength structures typically formed from Carbon Graphite, Kevlar, E-glass or other reinforcing materials are mixed with resin or pre-impregnated with the resin to act as a bonding agent. Such composite materials are used to form structures which when cured create lightweight, high strength components in applications including those found in the aerospace industry, e.g., for making such parts as aircraft wings, tail structures, control surfaces and fuselages or body panels. Such structures may also be used to form components in applications including those found in the automobile industry, e.g., for making chassis components and the like, and may be used to form components in other industries for other similar types of applications, i.e., applications calling for light weight, high strength structures. An advantage of such composite materials in constructing such components is their desired high strength to weight ratio as compared to other more typical materials and/or methods of manufacturing.

A challenge that exists is to further increase the physical properties of the structures formed from such composite materials without adding significant additional weight. It is, therefore, desired that a method be developed for further increasing the physical properties of light weight, high strength structures in a manner that does not add significant weight, and that does not add complexity to the method of manufacturing composite structures.

SUMMARY

Forming systems and assemblies as disclosed herein comprise a composite material comprising a reinforcing component and a resin component combined with the reinforcing component. A forming element is disposed within the composite material, wherein the forming element is made from a material having a higher coefficient of thermal expansion than the composite material. In an example, the forming element is made from a material having a surface energy that is less than that of the composite material. The composite material may comprise one or more passages extending from a surface thereof to the forming element. The composite material may include a surface feature positioned adjacent the forming element that is elevated relative to a surface of the composite material. In an example, the surface feature is an integral reinforcing structure. In an example, the forming element comprises a fluoropolymeric material. If desired, the forming element may comprise one or both of a conductive element and a conductive material disposed therein. If desired, the forming element may comprise an open channel extending therethrough. In an example, the forming element comprises body and a core disposed within the body, wherein the core has a degree of rigidity that is greater than the body.

Composite structures as disclosed herein are made by forming a composite panel comprising sheets of reinforcing material and a resin in contact with the sheets. One or more forming elements are placed within the composite panel at a location where a hollow passage within the composite structure is desired. As noted above, the forming element is made from a material having a higher coefficient of thermal expansion than the composite panel, the composite panel and forming element forming an assembly. The assembly is then treated, e.g., heated, to cure the composite panel to form the composite structure. The assembly and/or the forming element is then treated, e.g., cooled, to cause the forming element to contract relative to the composite structure and become detached from the composite structure, thereby providing the desired composite structure. In an example, liquid can be dispersed through the forming element to either effect heating or cooling as useful to cure the composite structure or contract the forming element therefrom, respectively. Alternatively, a conductive element may be disposed within the forming element to heat and/or cool it during processing. The method of making may include forming one or more passages extending from the surface of the composite panel to the forming element.

BRIEF DESCRIPTION OF DRAWINGS

These and other features and advantages of the concepts as disclosed herein will be appreciated as the same becomes better understood by reference to the following description when considered in connection with the accompanying drawings wherein:

FIG. 4 is a perspective view illustrating an example composite panel and forming element assembly comprising number of forming elements as disposed within a composite panel in a particular pattern which would typically be generated with FEA software to enhance the physical characteristics of the panel in the specific application it is being designed for;

DESCRIPTION

Forming methods, techniques, and materials associated therewith as disclosed herein utilize principals of differential thermal properties and low surface energy, e.g., typically associated with materials such as fluoropolymers such as PTFE and the like, to develop shapes within composite structures useful for adding significant strength to the structures without adding any additional primary or extraneous materials. The shapes as briefly noted above can be in the form of reinforcements that could be utilized in areas that were determined by Finite Element Analysis, (FEA), to require additional strength.

Structures that may benefit from the forming methods as disclosed herein include but are not limited to those formed from composite materials such as Carbon Graphite, Kevlar, E-glass or other reinforcing materials that are mixed with resin or pre-impregnated with the resin to act as a bonding agent to form structures which when cured create lightweight, high strength components. Accordingly, it is to be understood that the term "composite" or "composite material" as used herein is to be construed to mean and cover all materials of the types and/or composition noted above, in addition to all other materials having similar constructions that have not otherwise been specifically identified.

Another possible application of forming methods, systems, and assemblies disclosed herein can be to design the passages into an airframe or the like of the aircraft and drill or laser small holes from the surface to the passages. Pressure or vacuum can be applied to the passages to enhance boundary layer control as an alternative to physical control surfaces. Another possible application would be to utilize the same passages to reduce aerodynamic drag in specific areas. Liquids or Gels could be utilized either dynamically or statically to dissipate heat or actively cool the surfaces to retain their strength and or reduce the infrared signature.

Figure 1:
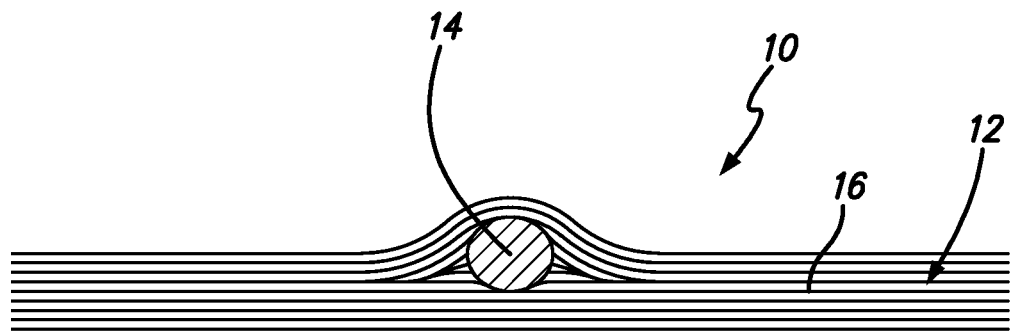
FIG. 1 is a cross sectional view of an example composite panel and forming element assembly as disclosed herein during a stage of forming.

FIG. 1 illustrates a forming system/assembly 10 comprising a composite panel 12 including a forming element 14 disposed within the panel, e.g., between the sheets or layers of the composite panel 12 during a forming process. The composite panel 12 may be formed from a number of different sheets 16 wherein the forming element 14 is interposed between the sheets to shape the composite panel 12 in a desired manner to form a structure. While the forming element has been shown as having a generally round or circular cross section, it is to be understood that forming elements as disclosed herein may be configured having a variety of differently-shaped cross sections that may not be circular (as illustrated for example in FIG. 2) as called for the particular desired composite structure and/or end use application.

In an example embodiment, the composite structure may be manufactured using conventional methods, with the addition of the forming element 14 sandwiched within the different sheets, fiber or fabric layers 16 and resin of the composite panel. In an example embodiment, the forming element is made from a material having a high coefficient of thermal expansion as compared to that of the surrounding composite panel, for the purpose of taking advantage of the differential expansion effect during heating and cooling. Thus, when the part is heated or subjected to elevated temperature treatment for curing, the forming element expands (due to its relatively high coefficient of thermal expansion) and the composite panel would take a set at this elevated temperature upon curing of the resin component. Upon allowing the part to return to ambient temperature, the forming element then contracts (due to its differential coefficient of thermal expansion relative to the composite panel), and delaminates or detaches from the composite panel and become loose therein to permit easy removal therefrom.

For purposes of reference and example, the coefficient of thermal expansion for a composite panel formed from carbon fiber is about $2\times10^{-6}$ mm/mm per ° C., and the coefficient of thermal expansion for a forming element made from PTFE is about $12\times10^{-5}$ mm/mm per ° C. Thus, in this example the PTFE has a coefficient of thermal expansion that is generally an order of magnitude higher than that of most other composites and plastics.

In addition to the forming element being made from a material having a relatively greater coefficient of thermal expansion than that of the composite material, it is desired that the forming element be made from a material having a low surface energy for the purpose of not adhering to the composite structure to thereby facilitate removal once it has contracted, delaminated from the composite panel, and become loose therein for removal therefrom. In an example, the forming element is used to form a hollow passage that operates to form an integral reinforcing rib in the composite. While a particular use of the forming element has been disclosed, it is to be understood that the method as disclosed herein of using the thermal properties of forming elements in conjunction with composite structures may be used to form one of any number of shapes within the composite structure as called for by the particular end-use application.

Materials useful as the forming element having the properties noted above include fluoropolymeric materials such as PTFE, PFA, ETFE, CTFE, ECTFE, TFM, PVDF and the like. In an example embodiment, a desired forming element is one formed from PTFE due to its high coefficient of thermal expansion relative to the composite material, and its low surface energy. The forming element can be a rod-shaped solid that is disposed within the composite panel with one end extending beyond the perimeter of the part for the purpose of removing the forming element from the formed composite structure after the forming element has contracted post cure.

Figure 2:
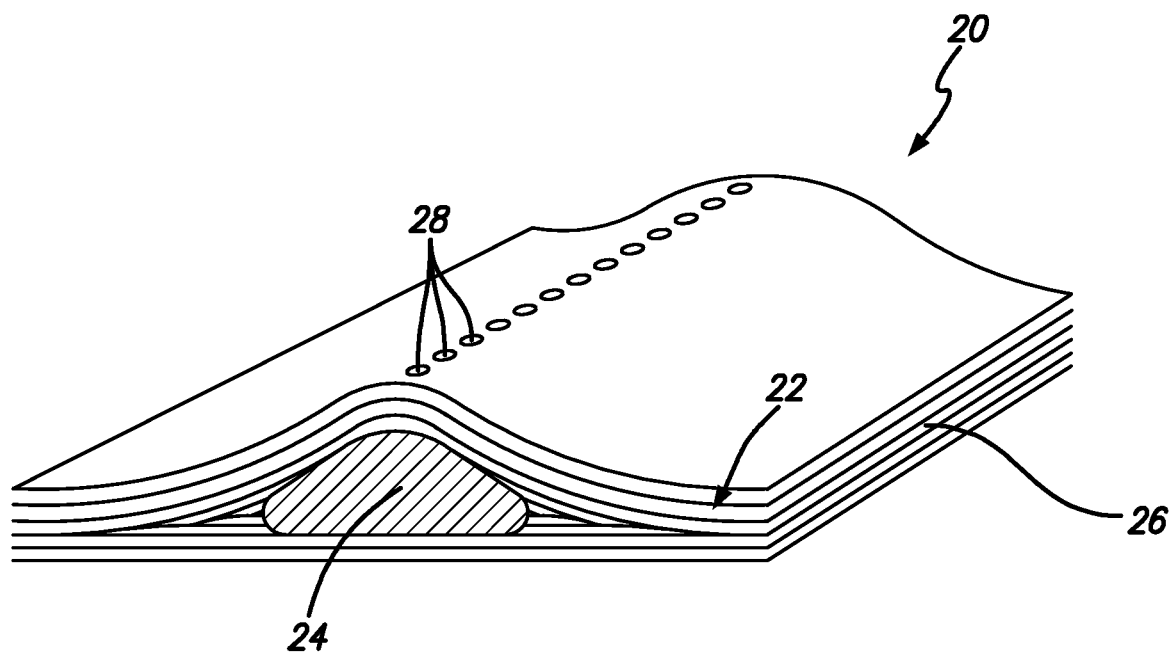
FIG. 2 is perspective view illustrating an example composite panel and forming element assembly, wherein the forming element has non-round shape, and wherein the composite panel comprises a plurality of openings extending from the forming element a surface of the panel.

FIG. 2 illustrates an example forming system/assembly 20 that is similar to that described above illustrated in FIG. 1. However, this example additionally comprises a number of passages 28 extending from the forming element 24, disposed within the composite panel 22 formed from a number of sheets 26, to a surface of the composite panel. This figure also illustrates the use of a forming element having a non-circular cross-sectional shape, e.g., for use in forming an imbedded rib structure having a desired shape according to the methods disclosed herein. It is to be understood that the forming element as disclosed herein may have any configuration cross-section as called for by the end-use application for the composite structure.

Additionally, this example illustrates how the forming system/assembly as disclosed herein may be used as a boundary layer control option if desired. This can be done, e.g., by forming one or more passages 28 through the composite panel 22 extending from its surface to the linear channel or hole formed in the composite panel by post processing such as laser or abrasive water jet and the like.

Figure 3:
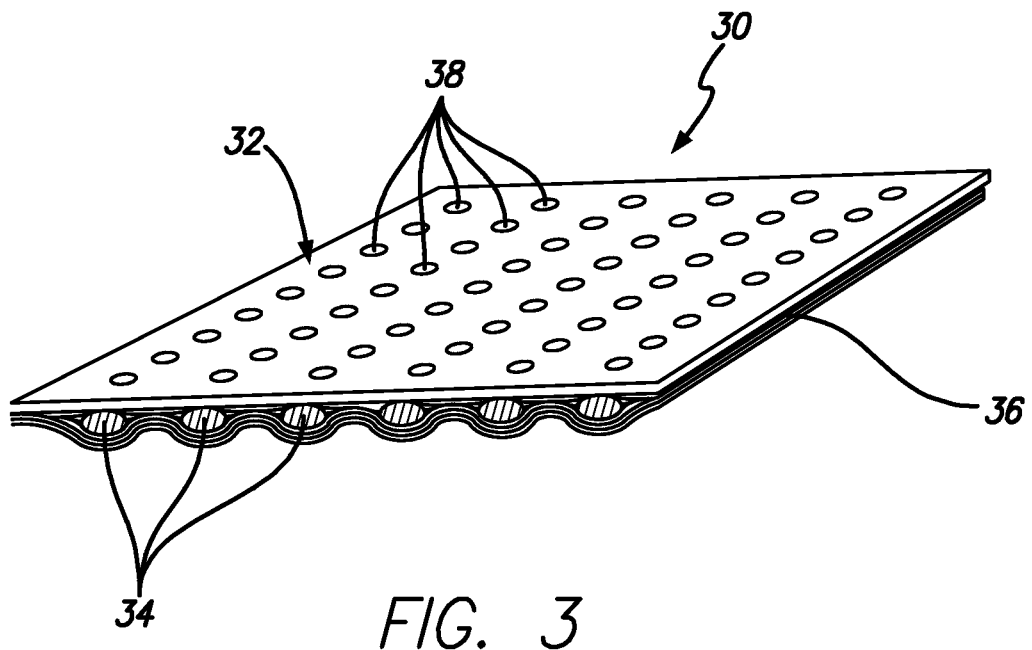
FIG. 3 is a perspective view illustrating an example composite panel and forming element assembly comprising number of forming elements as disposed within a composite panel, wherein the composite panel comprises a plurality of openings extending from the forming elements.

FIG. 3 illustrates an example forming system/assembly 30 comprising a composite panel 32 formed from a number of sheets 36, wherein the composite panel includes a number of forming elements 34 disposed therein in a desired manner/arrangement depending on a particular end-use application for the composite structure. The composite panel 32 comprises a number of passages 38 extending through its surface, e.g., a control surface, to an underlying forming element 34, wherein the passages are arranged in series running along a length of a respective forming element. The passages 38 in this example may be used to allow a vacuum or pressure to be applied to the surface of the composite structure, e.g., to enhance boundary layer control as an alternative to physical control surfaces.

Figure 4:
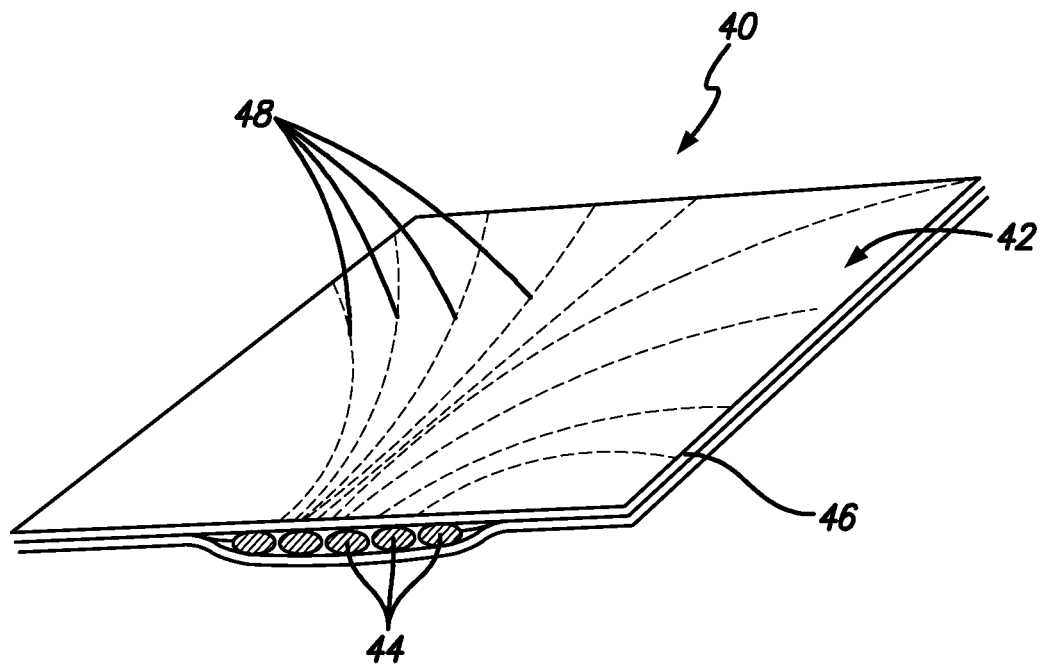

FIG. 4 illustrates an example forming system/assembly 40 comprising a composite panel 42 formed from a number of sheets 46, wherein the composite panel includes a number of forming elements 44 disposed therein and arranged/oriented in a desired manner depending on a particular end-use application. In this example, the forming elements are provided having a particular pattern that could, e.g., be determined by FEA or the like to provide an optimum degree of strength and weight reduction to the so-formed structure. The phantom lines 48 illustrate in this example the particular pattern of respective forming elements disposed in the composite panel 42.

Figure 5:
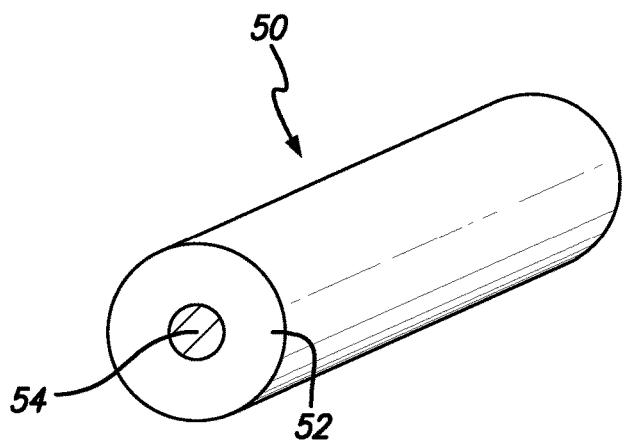
FIG. 5 is a perspective view of an example forming element with a reinforcement element embedded in it.

FIG. 5 illustrates a forming element 50 used with the forming systems/assemblies as disclosed herein. In this example, the forming element comprises a body 52 formed from the materials noted above, and includes an inner or embedded reinforcement element 54 that is disposed into the body. In an example, the embedded element 54 may extend axially through the body. The embedded element may be used to provide an additional amount/degree of strength to the forming element, which may permit more freedom of design and allow use of a forming element having a high slenderness ratio to meet a desired structure configuration for a particular end-use application. The embedded element 54 may also be used to provide a conductive element for the purpose of directly heating the forming element, e.g., in applications where room temperature curing of the composite structure is desired. In addition to or as an alternative to the embedded element, the forming element may comprise an additive material dispersed therein that may be heated electrically and/or by means of other external energy such as microwave or external radiation. The additive material may be homogeneously dispersed within the forming element or may be present in the form of one or more heterogeneous members.

Figure 6:
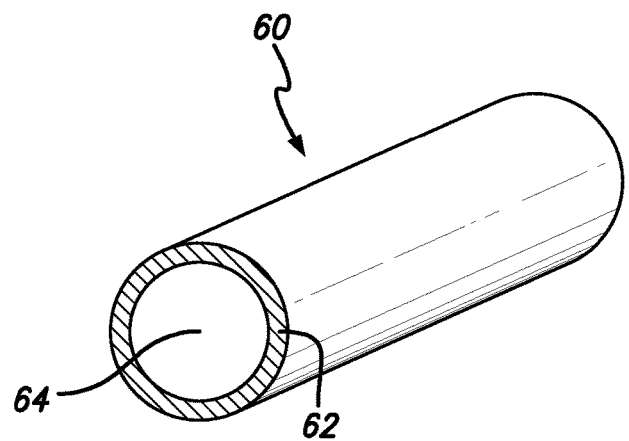
FIG. 6 is a perspective view of an example forming element comprising a hollow internal cavity.

FIG. 6 illustrates a hollow forming element 60 used with the forming systems/assemblies as disclosed herein. In this example, the forming element comprises a body 62 in the form of a wall structure. The wall structure may be formed from the materials disclosed above, and in a particular example may be formed from PFA. In this example, the forming element has a central opening 64 extending axially therethrough that is provided for accommodating the passage of liquids, gels, and/or conductive elements to heat and/or cool the forming element, and/or to cool, heat or create antennae that may be disposed therein.

Figure 7:
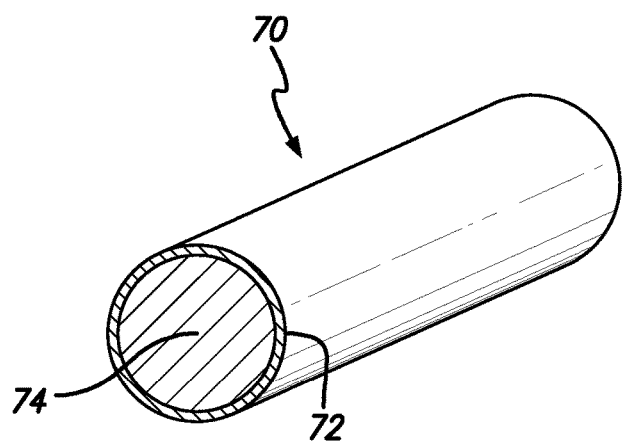
FIG. 7 is a perspective view of an example composite structure comprising a relatively thin wall construction constructed in accordance with the concept as disclosed herein.

FIG. 7 Illustrates an example composite structure 70 made according to the forming systems/assemblies as disclosed herein. In this example, the composite structure is provided in the form of an annular thin-wall structure 72 comprising a forming element 74 as disclosed above disposed therein. This example is provided for purposes of illustrating the different composite structure configurations that are capable of being formed using the methods, systems/assemblies as disclosed herein.

While examples methods, systems/assemblies have been disclosed above and illustrated, it is to be understood that other approaches using the concepts as disclosed herein exist and are understood to be within the scope of the disclosure. For example, in composite forming applications were heating the forming element is not desired or possible, formation of the composite structure may still be achieved by cooling or chilling the construction or forming element after curing, causing the forming element to contract relative to the composite construction for removal.

Additionally, while particular materials have been disclosed above as being useful for making the forming element, if a great degree of diameter reduction is desired, the forming element may be formed from an elastomeric compound. In such example, it may be desired that the elastomeric compound have a surface treatment to provide a desired low surface energy to ensure detachment/release and removal from the composite structure. In an example, the elastomeric compound may be impregnated or otherwise treated to include one or more fluoropolymers disposed therein. Such would allow for a certain amount of stretching, which would operate to enhance the desired enhanced reduction in diameter, while also ensuring release for purposes of removal from the composite structure.

What is claimed:

1. A method for making a composite structure comprising the steps of:
    forming a composite panel comprising opposed first and second sheets of reinforcing material and a resin in contact with the first and second sheets;
    providing a hollow passage in the composite structure by mold process comprising combining the composite panel with a forming element consisting of a fluoropolymeric material having a low surface energy relative to the composite panel and having a coefficient of thermal expansion that is about ten times or more greater than the composite panel, wherein the forming element has a round or oval cross-sectional shape and is placed in direct contact between the first and second sheets at a location where a hollow passage within the composite structure is to be formed;
    subjecting the forming element to an elevated temperature to cause the forming element to expand outwardly moving the opposed first and second sheets in direct contact with the forming element away from one another and curing the composite panel at elevated temperature to form the composite structure, wherein during the step of curing the hollow passage of the composite structure takes the form of the forming element in such an expanded state, and wherein opposed portions of the first and second sheets outside of the hollow passage in contact with one another are bonded together; and
    reducing the temperature of the forming element to cause it to contract from its expanded state relative to the composite structure due to the relatively low coefficient of thermal expansion of the composite structure to facilitate detachment and removal from the composite structure due to the low surface energy of the forming element relative to the composite structure.

2. The method as recited in claim 1 wherein the fluoropolymeric material is polytetrafluoroethylene.

3. The method as recited in claim 1, wherein the step of subjecting includes subjecting the composite panel to the elevated temperature.

4. The method as recited in claim 3, wherein the step of causing the forming element to contract takes place by cooling the forming element.

5. The method as recited in claim 1, wherein the method further comprises forming one or more passages extending from at least one of a top or bottom surface of the composite structure outer surface to the hollow passage.

6. The method as recited in claim 1 wherein, during the step of treating, a distal end of the forming element is exposed to an environment outside of the composite structure.

7. Allowable The method as recited in claim 1 wherein, during the step of treating, the portions of the first and second sheets that are bonded together are located adjacent opposite sides of the hollow passage.

8. Allowable The method as recited in claim 7, wherein the bonded together portions of the first and second sheets extend longitudinally along the hollow passage.

9. The method as recited in claim 1, wherein the forming element is solid.

10. A method for forming a composite structure comprising the steps of:
    using a single forming element formed of a fluoropolymeric material and placing the single forming element in direct contact between first and second reinforcing elements within a composite panel where a hollow passage is desired, the composite panel comprising the first and second reinforcing elements and a resin in contact therewith, the single forming element having a low surface energy relative to the composite panel and having a coefficient of thermal expansion at least ten times greater than that of the composite panel, wherein the single forming element has a round or oval cross-sectional shape;
    subjecting the forming element to heat to expand the forming element and move the first and second reinforcing elements in direct contact therewith away from one another;
    curing the composite panel to form the composite structure while the forming element is in an expanded state such that the hollow passage of the composite structure takes the shape of the forming element in such an expanded state, wherein the first and second reinforcing elements located outside of the hollow passage and adjacent opposed sides of the hollow passage and in contact with one another are bonded together during the step of curing;
    cooling the forming element to cause it to contract to facilitate removal from the composite structure due to the difference in the coefficient of thermal expansion of the forming element relative to the composite structure and the low surface energy of the forming element relative to the composite structure; and
    forming one or more passages extending through the composite structure to the hollow passage, wherein one or more passages are located along at least one of a top or bottom surface of the composite structure outer surface.

11. The method as recited in claim 10, wherein the forming element comprises at least one of an embedded element comprising a conductive element or a conductive material, an additive material distributed within the forming element, or a passage for accommodating a fluid therein and wherein the step of subjecting comprises causing the embedded element to increase in temperature to cause the forming element to expand.

12. The method as recited in claim 10, wherein during the step of curing, a distal end of the forming element is exposed to an environment outside of the composite structure.

13. The method as recited in claim 10 wherein the fluoropolymeric material is polytetrafluoroethylene.

14. The method as recited in claim 10 wherein the forming element comprises one of an additive material distributed homogeneously or heterogeneously within the forming element that can be activated to heat and expand the forming element, or a passage therein for accommodating a fluid to heat and expand the forming element.

15. The method as recited in claim 10, wherein the forming element is solid.

16. A method for forming a composite structure comprising the steps of:
    forming a hollow feature within a composite panel comprising first and second reinforcing materials and a resin by placing a forming element in direct contact with and between the first and second reinforcing materials, wherein the forming element is formed from a fluoropolymeric material having low surface energy relative to the composite panel and having a coefficient of thermal expansion that is ten times or more that of the composite panel, wherein the forming element has a round or oval cross-sectional shape and comprises at least one of an embedded element comprising a conductive element or a conductive material, an additive material distributed within the forming element, or a passage for accommodating a fluid therein all configured to heat and expand the forming element;
    subjecting the forming element to an elevated temperature to cause the forming element to expand when disposed within the composite panel causing the first and second reinforcing material in direct contact with the forming element to be subjected to an outwardly directed pressure from the forming element;
    curing the composite panel in an elevated temperature environment so that the hollow feature takes the shape of the forming element in the expanded state to form the composite structure, wherein portions of the first and second reinforcing materials outside of the hollow feature and positioned adjacent opposed sides of the hollow feature and in contact with each other are bonded together during the step of curing; and
    reducing the temperature of the forming element to cause the forming element to contract relative to the composite structure due to the difference of the forming element coefficient of thermal expansion relative to the composite and detach from the composite structure due to the difference in the coefficient of thermal expansion and difference in surface energy relative to the composite structure for removal of the forming element from the composite structure.

17. The method as recited in claim 16 wherein, during the step of curing, a distal end of the forming element is exposed to an environment outside of the composite structure.

18. The method as recited in claim 17, wherein the hollow feature in the composite structure is a passage, and wherein the bonded together portions of the first and second reinforcing materials extend longitudinally along the passage.

19. The method as recited in claim 16 wherein the composite structure includes one or more passages extending through the composite structure to the hollow feature, wherein the one or more passages are positioned along at least one of a top surface or a bottom surface of the composite structure.

20. The method as recited in claim 16 wherein the fluoropolymeric material is polytetrafluoroethylene.

21. The method as recited in claim 16, wherein the forming element comprises one of an additive material distributed homogeneously or heterogeneously within the forming element that can be activated to heat and expand the forming element, or a passage therein for accommodating a fluid to heat and expand the forming element.

* * * * *